US012179765B2

United States Patent
Nakahira et al.

(10) Patent No.: US 12,179,765 B2
(45) Date of Patent: Dec. 31, 2024

(54) VEHICLE CONTROL APPARATUS FOR REDUCING NOISE DURING SQUARE WAVE MOTOR CONTROL

(71) Applicant: SUBARU CORPORATION, Tokyo (JP)

(72) Inventors: Shinichirou Nakahira, Tokyo (JP); Naoto Chiba, Tokyo (JP); Takuya Yano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 278 days.

(21) Appl. No.: 17/690,378

(22) Filed: Mar. 9, 2022

(65) Prior Publication Data
US 2022/0306118 A1    Sep. 29, 2022

(30) Foreign Application Priority Data

Mar. 25, 2021 (JP) .................. 2021-051840

(51) Int. Cl.
*B60W 30/20* (2006.01)
*B60W 10/08* (2006.01)

(52) U.S. Cl.
CPC ............ *B60W 30/20* (2013.01); *B60W 10/08* (2013.01); *B60W 2030/206* (2013.01);
(Continued)

(58) Field of Classification Search
CPC .................. B60W 30/20; B60W 10/08; B60W 2030/206; B60W 2510/083;
(Continued)

(56) References Cited

U.S. PATENT DOCUMENTS

2006/0076914 A1*   4/2006   Yaguchi ............... H02P 25/098
                                                         318/432
2010/0072925 A1    3/2010   Itoh et al.
(Continued)

FOREIGN PATENT DOCUMENTS

JP   2010-081658 A       4/2010
JP   2013099042 A   *   5/2013
(Continued)

OTHER PUBLICATIONS

Office Action dated Nov. 19, 2024 in the corresponding Japanese Patent Application No. 2021-051840, w/ English translation.

*Primary Examiner* — Hunter B Lonsberry
*Assistant Examiner* — Daniel M. Robert
(74) *Attorney, Agent, or Firm* — Rimon P.C.

(57) ABSTRACT

A vehicle control apparatus includes a storage and a processor. The storage holds a first resonance map. The processor calculates a first torque command value that indicates a value of torque to be outputted by a first driving source. The first resonance map includes, as one or more first resonance points, one or more operating points at which resonance occurs in an operating region of the first driving source under a square wave control. The processor decreases or increases the first torque command value to avoid the one or more first resonance points on the condition that a predicted route of transition of an operating point of the first driving source meets the one or more first resonance points.

4 Claims, 14 Drawing Sheets

(52) U.S. Cl.
CPC . *B60W 2510/083* (2013.01); *B60W 2510/087* (2013.01); *B60W 2510/246* (2013.01); *B60W 2710/083* (2013.01)

(58) Field of Classification Search
CPC ..... B60W 2510/087; B60W 2510/246; B60W 2710/083; B60W 20/17; B60K 6/48; B60L 15/20; B60L 2240/42
See application file for complete search history.

(56) References Cited

U.S. PATENT DOCUMENTS

| | | | |
|---|---|---|---|
| 2019/0195352 A1 | 6/2019 | Jojima et al. | |
| 2020/0384867 A1* | 12/2020 | Yamada | H02P 23/04 |
| 2022/0306118 A1* | 9/2022 | Nakahira | B60K 6/48 |

FOREIGN PATENT DOCUMENTS

| | | | | |
|---|---|---|---|---|
| JP | 2019-115110 A | 7/2019 | | |
| WO | WO-2016042894 A1 * | 3/2016 | | B60W 10/00 |

\* cited by examiner

VEHICLE CONTROL APPARATUS FOR REDUCING NOISE DURING SQUARE WAVE MOTOR CONTROL

CROSS-REFERENCE TO RELATED APPLICATIONS

This application claims priority from Japanese Patent Application No. 2021-051840 filed on Mar. 25, 2021, the entire contents of which are hereby incorporated by reference.

BACKGROUND

The technology relates to a vehicle control apparatus.

Japanese Unexamined Patent Application Publication (JP-A) No. 2010-081658 discloses a system that controls a rotating electric machine mounted on a vehicle. The system is switched between a control mode in which the rotating electric machine is driven with a sine wave current and a control mode in which the rotating electric machine is driven with a square wave voltage. In the system, the control mode with the sine wave current is used in a low-speed range and the control mode with the square wave voltage is used in a high-speed range.

SUMMARY

An aspect of the technology provides a vehicle control apparatus to be mounted on a vehicle. The vehicle includes a first driving source and a first wheel to which torque is to be outputted from the first driving source. The first driving source includes an electric motor. The vehicle control apparatus includes a storage and a processor. The storage is configured to hold a first resonance map. The processor is configured to calculate a first torque command value that indicates a value of the torque to be outputted by the first driving source. The first resonance map includes, as one or more first resonance points, one or more operating points at which resonance occurs in an operating region of the first driving source under a square wave control. The processor is configured to decrease or increase the first torque command value to avoid the one or more first resonance points on the condition that a predicted route of transition of an operating point of the first driving source meets the one or more first resonance points.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
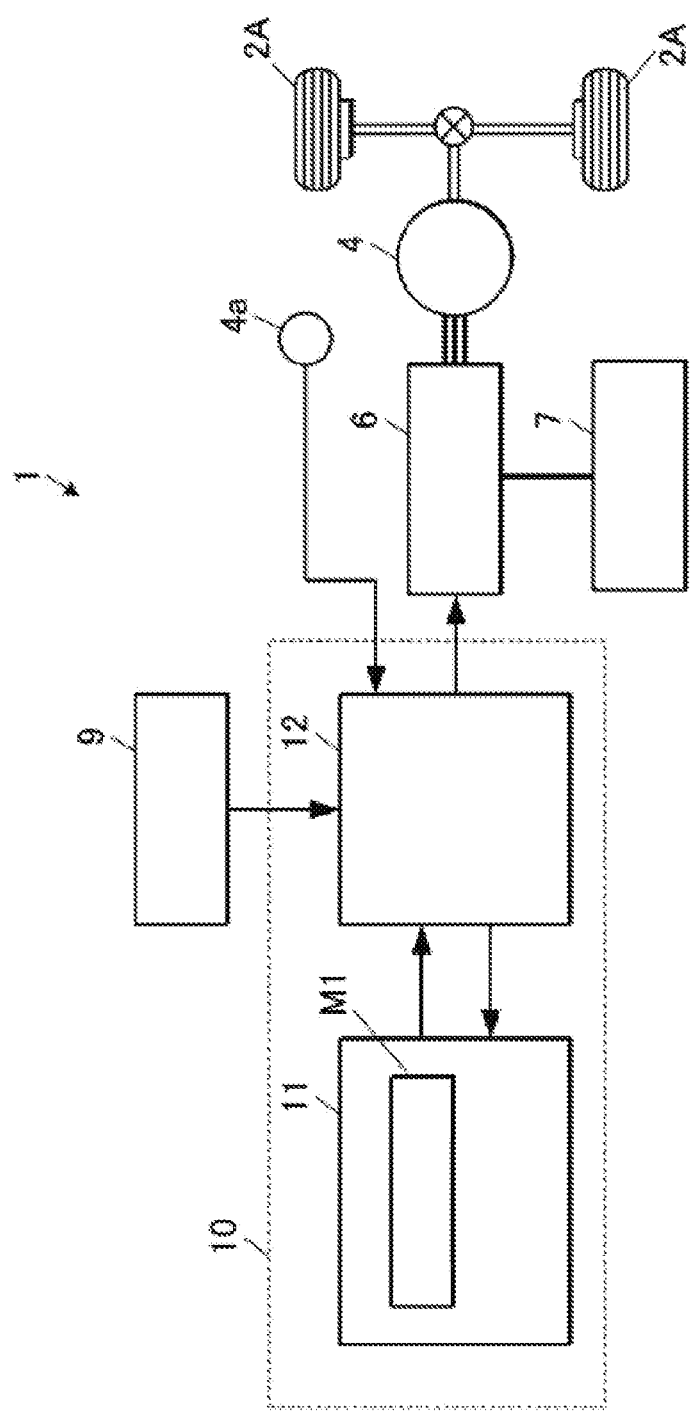
FIG. 1 is a block diagram of a vehicle on which a vehicle control apparatus according to a first embodiment of the disclosure is mounted.

In an existing system as disclosed in JP-A No. 2010-081658, a square wave voltage includes a higher harmonic component. Driving an electric motor of a vehicle with the square wave voltage causes electrical resonance in the electric motor and its vicinities. Such resonance may cause a noise sound in the vehicle.

It is desirable to provide a vehicle control apparatus that makes it possible to reduce a noise sound that occurs on the occasion of a square wave control of an electric motor.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Embodiment

Figure 2:
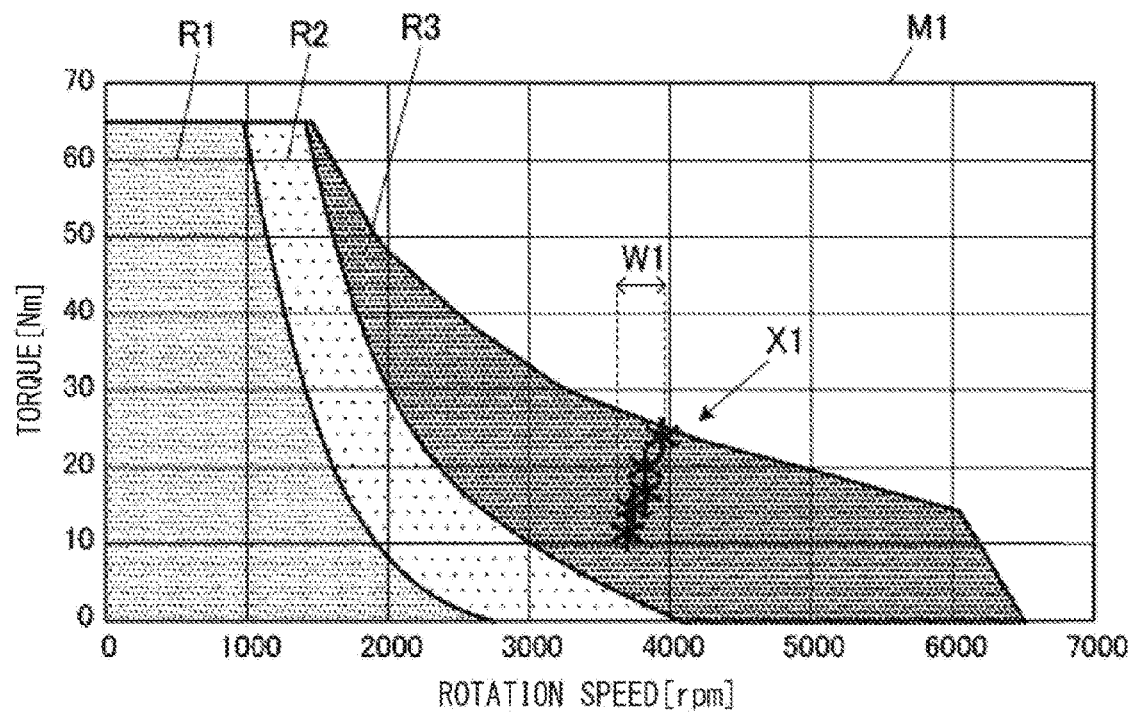
FIG. 2 is a graph that illustrates a first resonance map held in a storage.

FIG. 1 is a block diagram of a vehicle on which a vehicle control apparatus according to a first embodiment of the disclosure is mounted. FIG. 2 is a graph that illustrates a first resonance map held in a storage.

As illustrated in FIG. 1, a vehicle control apparatus 10 according to the first embodiment may be mounted on a vehicle 1. The vehicle 1 may include, without limitation, a first driving source 4. The first driving source 4 may include, without limitation, an electric motor. The first driving source 4 is configured to be sometimes brought to under a square wave control, and output torque to first wheels 2A. The vehicle control apparatus 10 includes, without limitation, a storage 11 and a processor 12. The storage 11 is configured to hold a first resonance map M1. The processor 12 is configured to calculate a first torque command value. The first torque command value indicates a value of the torque to be outputted by the first driving source 4. The vehicle 1 may further include, without limitation, a speed sensor 4a. The speed sensor 4a is configured to calculate directly or indirectly a rotation speed of the first driving source 4. A measured value of the speed sensor 4a may be sent to the processor 12. The vehicle 1 may further include, without limitation, a driving operation unit 9, a battery 7, and an inverter 6.

As illustrated in FIG. 2, the first resonance map M1 includes, as first resonance points X1, one or more operating points at which resonance occurs in the first driving source 4 or its vicinities in an operating region R3 of the first driving source 4 under the square wave control. Each of the one or more operating points may serve as the first resonance point X1. In FIG. 2, each of the first resonance points X1 is denoted by an asterisk "*". The first resonance map M1 may be created in advance on the basis of, for example, tests or simulation, and held in the storage 11.

Operating regions of the first driving source 4 may be represented by two-dimensional regions that have, as components, the rotation speed of the first driving source 4 and the torque of the first driving source 4. Any point in the relevant regions corresponds to one operating point of the first driving source 4.

The operating regions of the first driving source 4 may include, without limitation, an operating region R1, the operating region R3, and an operating region R2. In the operating region R1, a sine wave control is carried out. In the operating region R3, the square wave control is carried out. In the operating region R2, a transient control between the sine wave control and the square wave control is carried out.

The sine wave control means a control that includes allowing the inverter 6 to output a sine wave current to the first driving source 4, to bring the first driving source 4 to powering operation or regenerative operation. The sine wave current is PWM (Pulse Width Modulation) modulated by a switching control. The square wave control means a control that includes allowing the inverter 6 to output a square wave pulse voltage corresponding to a rotation phase of the first driving source 4, to bring the first driving source 4 to the powering operation. The square wave pulse voltage may be generated by ON and OFF switching of a power semiconductor switch element of the inverter 6 at the occasion of a rise and a fall of the voltage. The transient control means a control that includes making a control above a maximum amplitude of a PWM modulable sine wave current, to allow the inverter 6 to output a current of a distorted wave shape with respect to a sine wave, to bring the first driving source 4 to the powering operation.

A plurality of the first resonance points X1 included in the first resonance map M1 is included in the operating region R3 in which the square wave control is carried out. The first resonance points X1 typically gather in a specific rotation speed range W1 in the operating region R3. The first resonance points X1 may sometimes gather in the single specific rotation speed range W1, or alternatively, the first resonance points X1 may sometimes gather in a plurality of the specific rotation speed ranges W1. Moreover, the first resonance points X1 are typically located at a higher torque level in the specific rotation speed range W1. In many cases, the first resonance points X1 are absent from a lower torque level in the specific rotation speed range W1.

Figure 3:
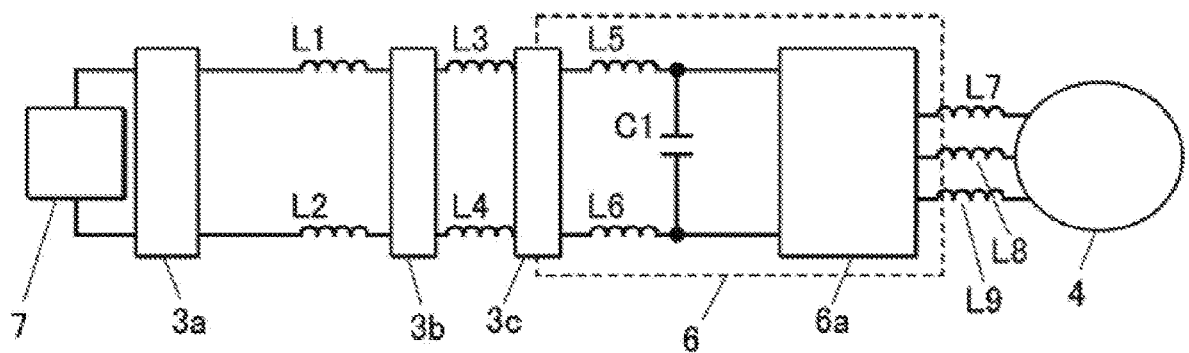
FIG. 3 is a diagram of a circuit configuration of a battery, an inverter, a first driving source, and their vicinities.

FIG. 3 illustrates a circuit configuration of the battery 7, the inverter 6, the first driving source 4, and their vicinities. As illustrated in FIG. 3, inductances L1 to L4, and L7 to L9 may be provided between the battery 7, the inverter 6, the first driving source 4, and their peripheral circuit. The peripheral circuit may include, without limitation, a relay 3a, and connectors 3b and 3c. The inverter 6 may include a switching circuit 6a. The inductances L5 and L6, and a capacitor C1 may be provided at a pre-stage of the switching circuit 6a. Accordingly, around the first driving source 4 and the inverter 6, the inductances L1 to L9 and the capacitor C1 may constitute a resonance circuit. This may sometimes cause electrical resonance at a specific frequency. The first resonance points X1 included in the first resonance map M1 are operating points where the electrical resonance as described above forms a physical vibration, causing generation of a noise sound. The square wave voltage includes a higher-order harmonic component, and easily has such electrical resonance. Thus, the first resonance points X1 are included in the operating region R3 under the square wave control.

The processor 12 may include, without limitation, an ECU (Electronic Control Unit). The ECU may include a CPU (Central Processing Unit), a RAM (Random Access memory), a ROM (Read Only Memory), and interfaces. The CPU may perform calculation processing. The CPU may expand data in the RAM. The ROM may hold a control program to be executed by the CPU. The interfaces may send and receive signals between the CPU and an external device of the processor 12. The processor 12 may include a single ECU, or alternatively, the processor 12 may include a plurality of ECUs that communicate with one another and operate in cooperation with one another.

The processor 12 may calculate a first torque command value on the basis of an operation of the driving operation unit 9 and predetermined limiting conditions. The operation of the driving operation unit 9 may include, for example, an amount of an accelerator operation and an amount of a brake operation. In one example, first, the processor 12 may calculate requested torque corresponding to the amount of the accelerator operation or the amount of the brake operation. The requested torque means torque requested by a driving operation. Furthermore, the processor 12 may calculate target torque on the basis of the requested torque in additional consideration of some limiting conditions. Non-limiting examples of the limiting conditions may include suppressing sudden torque fluctuation. Thus, the processor 12 may set the target torque as the first torque command value of the first driving source 4. In a case with a plurality of driving sources, the processor 12 may determine a ratio of assignment of the target torque to each driving source, and set the target torque assigned to the first driving source 4 as the first torque command value.

The first torque command value means a value of the torque to be outputted from the first driving source 4. The first torque command value may be sent to a control circuit of the inverter 6. The control circuit of the inverter 6 may make a feedback control to allow torque matching the first torque command value to be outputted from the first driving source 4, to control operation of the inverter 6. The operation of the inverter 6 allows for electric power transmission between the battery 7 and the first driving source 4. This brings the first driving source 4 to the powering operation or the regenerative operation, causing the torque of the first torque command value to be outputted.

Furthermore, in a case where a predicted locus of an operating point of the first driving source 4 meets the first resonance points X1, the processor 12 is configured to decrease or increase the first torque command value to avoid the first resonance points X1. For the predicted locus of the operating point of the first driving source 4, see a predicted locus K3 in FIG. 4. The predicted locus of the operating point means a locus of an operating point in a case where a rate of change in the torque is kept constant, or the torque is kept constant. The rate of change in the torque means an amount of change per unit time. In calculating the locus of the operating point, the processor 12 may calculate an amount of change in the rotation speed of the first driving source 4 on the basis of the torque and an incline of a road surface. Alternatively, the processor 12 may calculate the amount of change in the rotation speed of the first driving source 4 with the use of a rate of change in the rotation speed with respect to immediately preceding torque, instead of the incline of the road surface. Each operating point on the predicted locus corresponds to a predicted route of transition of the operating point of the first driving source 4.

Furthermore, after decreasing or increasing the first torque command value to avoid the first resonance points X1, in a case where the processor 12 determines that the predicted route of the transition of the operating point of the first driving source 4 avoids the first resonance points X1, the processor 12 may gradually increase or decrease the first torque command value to restore the first torque command value to the target torque. Upon the restoration of the first torque command value to the target torque, the processor 12 may calculate again the target torque as the first torque command value.

Allowing the operating point of the first driving source 4 to avoid the first resonance points X1 makes it possible to suppress the generation of the noise sound.

Operation Example

Figure 4:
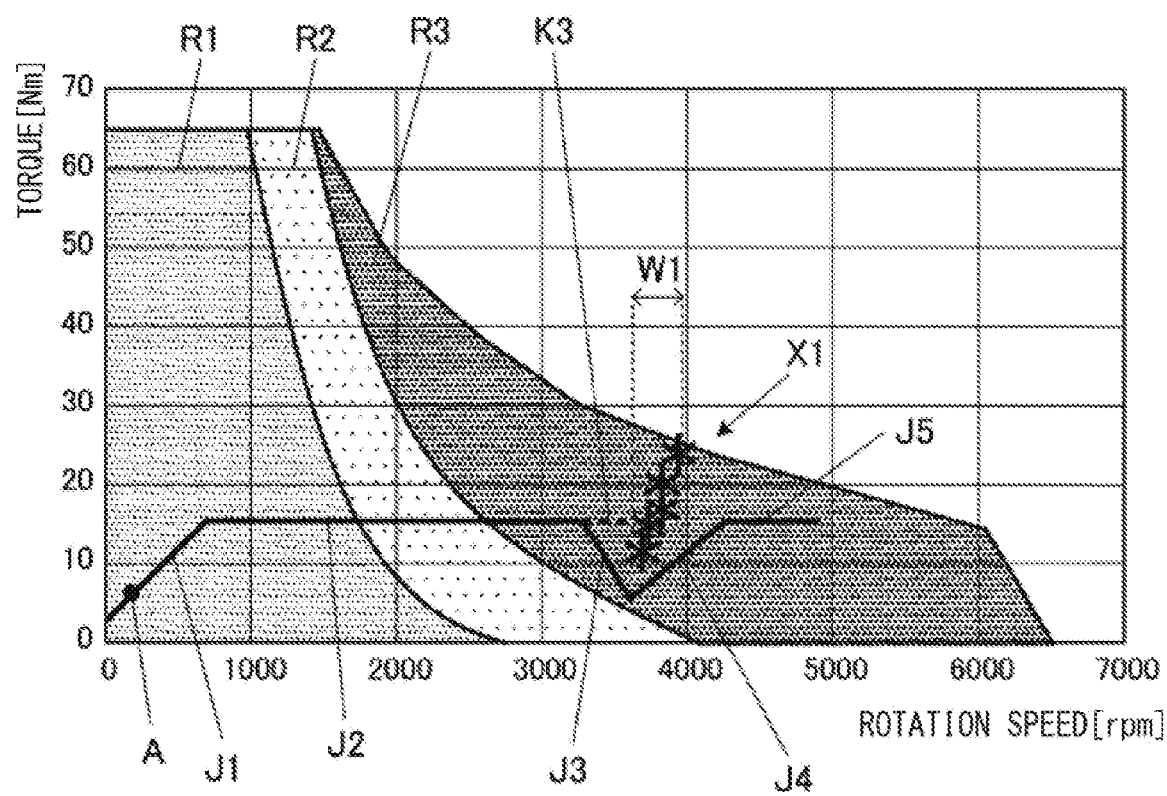
FIG. 4 is a graph that illustrates an example of workings of the vehicle control apparatus according to the first embodiment.

FIG. 4 illustrates an example of workings of the vehicle control apparatus according to the first embodiment. Loci J1 to J4 in FIG. 4 denote transitions of an operating point A of the first driving source 4 in one travel example of the vehicle 1. That is, as illustrated in FIG. 4, in the operating regions of the first driving source 4, the operating point A of the first driving source 4 makes the sequential transitions along the loci J1 to J5. In the travel example in FIG. 4, the vehicle 1 is accelerated by an output of the torque by the first driving source 4. This is accompanied by a gradual increase in the rotation speed of the first driving source 4.

On the locus J1, a driver increases the amount of the accelerator operation, causing an increase in the torque from the first driving source 4. On the locus J2, the driver maintains the amount of the accelerator operation, keeping the torque from the first driving source 4 substantially constant. In a case where the operating point A is located in the operating region R3 under the square wave control, the processor 12 may determine whether or not the predicted route of the transition of the operating point A, i.e., the operating point on the predicted locus K3, meets the first resonance points X1.

In the travel example in FIG. 4, the driver maintains the amount of the accelerator operation while the operating point A makes the transitions along the locus J3. Accordingly, on the predicted locus K3, the rotation speed of the first driving source 4 increases while the torque is constant, and the predicted locus K3 meets the first resonance points X1. In a case where the processor 12 determines that the predicted locus K3 meets the first resonance points X1, the processor 12 is configured to increase or decrease the first torque command value to avoid the first resonance points X1. In the arrangement of the first resonance points X1 in FIG. 4, there is a refuge space at the lower torque level for the locus K3 to avoid the first resonance points X1. Accordingly, the processor 12 may decrease the first torque command value. As a result, on the locus J3, the torque decreases, allowing the locus J3 to avoid the first resonance points X1.

On the locus J4, determining that the operating point A of the first driving source 4 has avoided the first resonance points X1, the processor 12 may gradually increase the first torque command value to allow the target torque to be close to the target torque. As a result, the torque increases. Thereafter, on the locus J5, the operating point A makes the transitions based on the first torque command value that matches the target torque.

With such control operation, in the case where the operating point A of the first driving source 4 is about to meet the first resonance points X1 in the region where the first driving source 4 is under the square wave control, the torque of the first driving source 4 decreases or increases to avoid the first resonance points X1. Hence, it is possible to suppress the generation of the noise sound because of the vibration caused by the electrical resonance around the battery 7, the inverter 6, and the first driving source 4.

Control Processing

Figure 5:
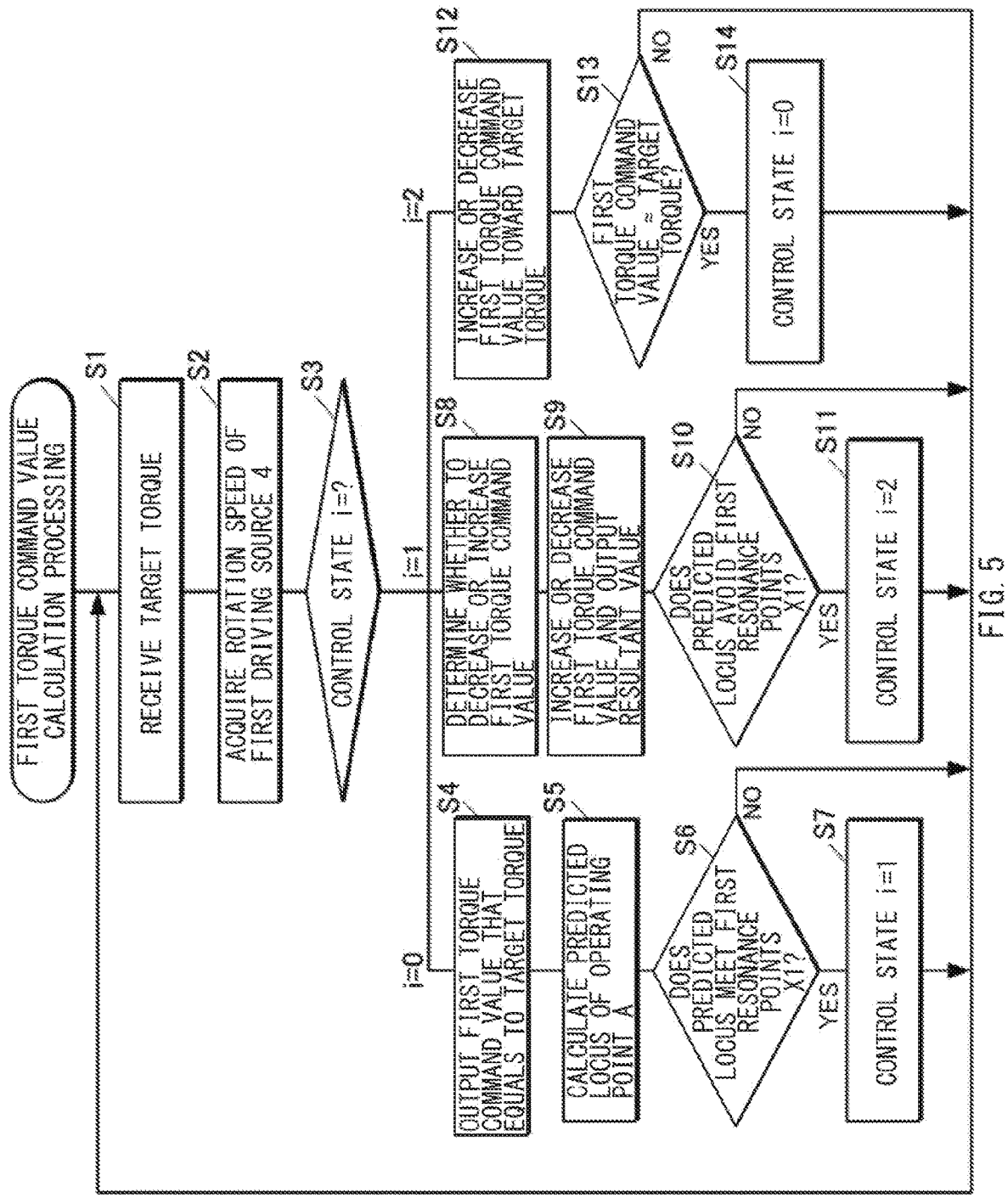
FIG. 5 is a flowchart of torque command value calculation processing to be carried out by a processor.

Description is given next of an example of control processing of the processor, to realize the control operation described above. FIG. 5 is a flowchart of torque command value calculation processing to be carried out by the processor. The processor may constantly and repeatedly carry out the torque command value calculation processing in FIG. 5 in a state where the vehicle 1 is ready to travel.

In the torque command value calculation processing, the processor 12 may first receive the target torque calculated in separate control processing (step S1). The target torque may be calculated on the basis of the driving operation and the predetermined limiting conditions. Furthermore, the processor 12 may acquire the measured value of the rotation speed of the first driving source 4 from the speed sensor 4a (step S2).

Thereafter, the processor 12 may cause the flow to branch out on the basis of a control state i (step S3). The control state i may take an initial value "0".

As a result, with the control state i=0, the flow may proceed to step S4, and thereupon, the processor 12 may output the target torque received in step S1 to the control circuit of the inverter 6 as the first torque command value (step S4).

Thereafter, the processor 12 may calculate the predicted locus of the operating point A of the first driving source 4, with the use of the first torque command value outputted at each control timing within a predetermined period of time retrospectively of the current time, and the value of the rotation speed of the first driving source 4 received at each control timing mentioned above (step S5). A length of the predicted locus to be calculated (period length) may be set to a period length in which a subsequent change in the torque makes it possible for the predicted locus to avoid the first resonance points X1 in the case where the predicted locus meets the first resonance points X1. As a method of calculating the predicted locus, the method described above may be adopted.

Thereafter, the processor 12 may compare the predicted locus with the first resonance map M1, and determine whether or not the predicted locus meets the first resonance points X1 (step S6). In a case where the determination results in negation (NO), the processor 12 may cause the flow to return to step S1. In a case where the determination results in affirmation (YES), the processor 12 may switch the control state i to a value "1" to increase or decrease the first torque command value (step S7), and cause the flow to return to step S1.

As a result of the branching process in step S3, in a case with the control state i=1, the processor 12 may cause the flow to branch out to step S8. The processor 12 may determine whether to decrease or increase the torque, on the basis of the arrangement of the plurality of the first resonance points X1 included in the first resonance map M1, and the first torque command value outputted at previous control timing (step S8). It suffices for the processor 12 to calculate an amount of change in the torque in a case where the torque is decreased to avoid the first resonance points X1, and an amount of change in the torque in a case where the torque is increased to avoid the first resonance points X1, and to select whichever option (increase or decrease) results in a smaller amount of change in the torque.

Thereafter, the processor 12 may increase or decrease the first torque command value in accordance with the option as determined in step S8, and output the resultant first torque command value to the control circuit of the inverter 6 (step S9). It suffices for the processor 12 to add or subtract a predetermined amount of change to or from the first torque command value outputted at the previous control timing, to increase or decrease the first torque command value. Increasing or decreasing the first torque command value here may be independent of the transitions of the target torque.

Thereafter, the processor 12 may determine whether or not the operating point A has avoided meeting the first resonance points X1, on the basis of the first torque command value outputted, and the arrangement of the plurality of the first resonance points X1 included in the first resonance map M1 (step S10). In one example, the processor 12 may predict the locus of the operating point A in a case where the first torque command value outputted is gradually restored toward the target torque, and determine whether or not the relevant locus meets the first resonance points X1. In affirmation (YES), the processor 12 may determine that the operating point A has not avoided meeting the first resonance points X1 yet. In negation (NO), the processor 12 may switch the control state i to a value "2" to restore the first torque command value toward the target torque (step S11), and cause the flow to return to step S1.

As a result of the branching process in step S3, in a case with the control state i=2, the processor 12 may cause the flow to branch out to step S12. Thus, the processor 12 may increase or decrease the first torque command value toward the target torque, and output the resultant first torque command value to the control circuit of the inverter 6 (step S12). For example, the processor 12 may add or subtract the predetermined amount of change to or from the first torque command value outputted at the previous control timing, to cause the first torque command value to be close to the target torque.

Thereafter, the processor 12 may determine whether the first torque command value outputted in step S12 substantially matches the target torque (step S13). In other words, the processor 12 may determine whether an absolute value of a difference between the first torque command value outputted in step S12 and the target torque is equal to or lower than a threshold. In negation (NO), the processor 12 may cause the flow to return to step S1. In affirmation (YES), the processor 12 may switch the control state i to the initial value "0" (step S14), and cause the flow to return to step S1.

In the torque command value calculation processing described above, in loop processing (steps S1 to S6) with the control state i=0, the determination may be made as to whether the predicted locus of the operating point A meets the first resonance points X1, while the calculation of the first torque command value may be made in the case where the predicted locus of the operating point does not meet the first resonance points X1. In loop processing (steps S1 to S3, and S8 to S10) with the control state i=1, the first torque command value may be increased or decreased to keep the locus of the operating point A from meeting the first resonance points X1. In loop processing (steps S1 to S3, and S12 and S13) with the control state i=2, after avoiding the first resonance points X1, the first torque command value may be restored to the target torque.

In the torque command value calculation processing, the processor 12 may determine whether or not the operating point A of the first driving source 4 is located in the operating region R3. Alternatively, the processor 12 may determine whether or not the operating point A of the first driving source 4 is located in the operating regions R2 and R3. Solely in a case where the determination results in affirmation (YES), the processor 12 may carry out the process (step S5) of calculating the predicted locus and the process (step S6) of comparing the predicted locus with the first resonance map M1. With such control processing, it is possible to save the processor 12 a load of the control processing in the case with the first driving source 4 under the sine wave control.

As described, according to the vehicle control apparatus 10 of the first embodiment, the storage 11 is configured to hold the first resonance map M1. The first resonance map M1 includes, as the first resonance points X1, the one or more operating points at which the resonance occurs in the operating region R3 of the first driving source 4 under the square wave control. In the case where the predicted route of the transition of the operating point A of the first driving source 4 meets the first resonance points X1, the processor is configured to decrease or increase the first torque command value to avoid the first resonance points X1. Hence, it is possible to suppress the generation of the noise sound caused by the electrical resonance occurring in the first driving source 4, the inverter 6, and their vicinities, in the case with the first driving source 4 under the square wave control.

Second Embodiment

Figure 6:
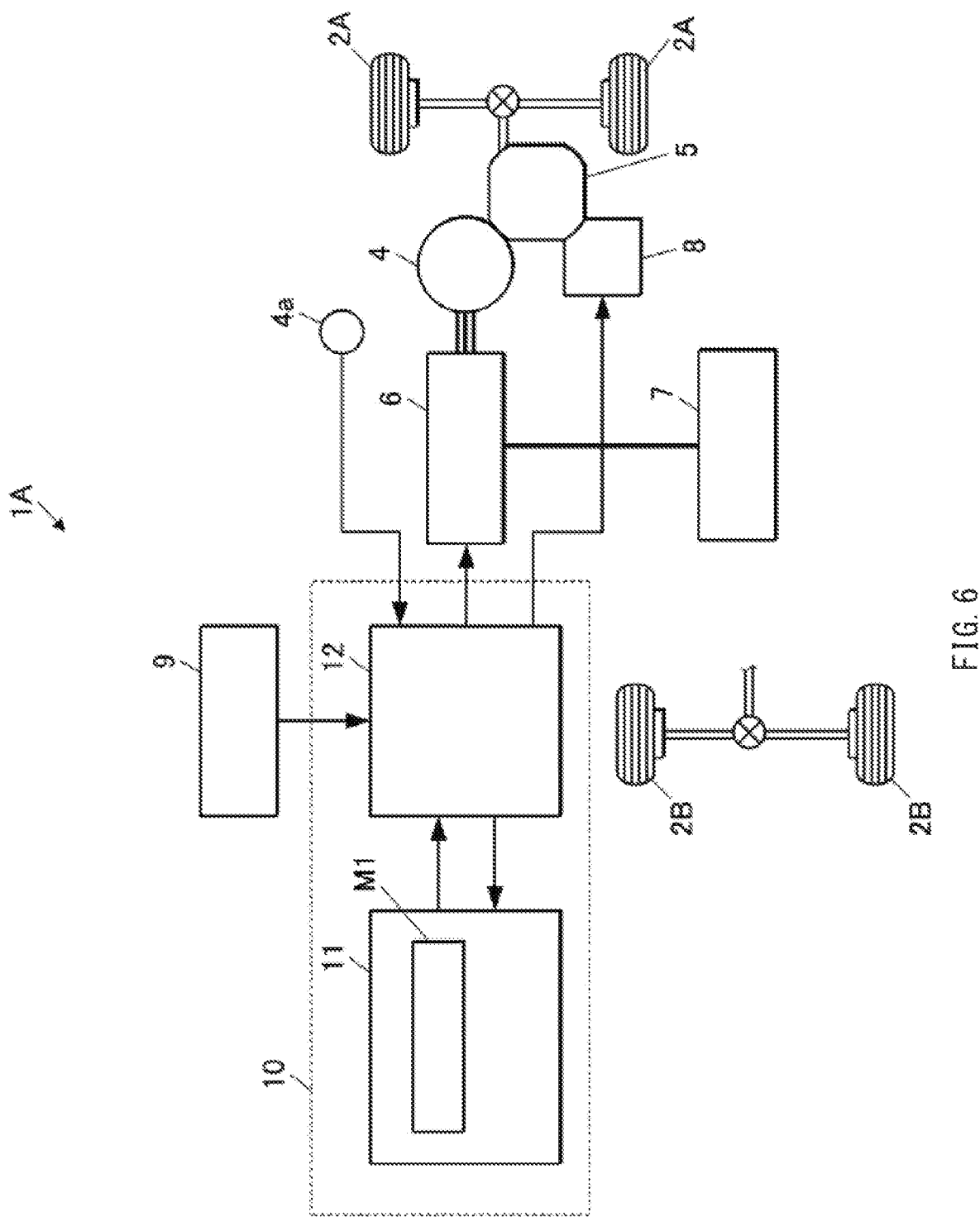
FIG. 6 is a block diagram of a vehicle on which a vehicle control apparatus according to a second embodiment of the disclosure is mounted.

FIG. 6 is a block diagram of a vehicle on which a vehicle control apparatus according to a second embodiment is mounted. A vehicle 1A on which a vehicle control apparatus 10 of the second embodiment is mounted may have a similar configuration to the first embodiment. In addition, the vehicle 1A may include, without limitation, a second driving source 5. The second driving source 5 is configured to output torque to the first wheels 2A. It is to be noted that constituent elements similar to those of the first embodiment are denoted by the same reference characters, and description thereof is omitted.

The second driving source 5 may include, without limitation, an engine, or an internal combustion engine. The vehicle 1A may include, without limitation, auxiliaries 8. The auxiliaries 8 are configured to drive the second driving source 5. It is to be noted that the second driving source 5 may include, without limitation, an electric motor that is not configured to be subjected to the square wave control. The first driving source 4 and the second driving source 5 may output torque respectively to separate wheels, e.g., the first wheels 2A and second wheels 2B, instead of outputting torque to the same wheels, i.e., the first wheels 2A.

The processor 12 may calculate a second torque command value, in addition to the first torque command value. The second torque command value indicates a value of the torque to be outputted by the second driving source 5. The second torque command value may be outputted to a control circuit of the auxiliaries 8. The control circuit of the auxiliaries 8 may make a feedback control to allow torque that matches the second torque command value to be outputted from the second driving source 5, to cause the auxiliaries 8 to operate.

As with the first embodiment, the processor 12 may carry out processing of predicting the locus of the operating point A of the first driving source 4, and increasing or decreasing the first torque command value to avoid the first resonance points X1, to keep the operating point A from meeting the first resonance points X1.

Furthermore, in decreasing the first torque command value to avoid the first resonance points X1, the processor 12 may carry out processing of increasing the second torque command value. Similarly, in increasing the first torque command value to avoid the first resonance points X1, the processor 12 may carry out processing of decreasing the second torque command value. Such processing may be carried out, to reduce an amount of change in total torque of the first driving source 4 and the second driving source 5, or to cause the total torque of the first driving source 4 and the second driving source 5 to be close to the target torque of the whole vehicle 1A, in increasing or decreasing the first torque command value.

Operation Example

Figure 7A:
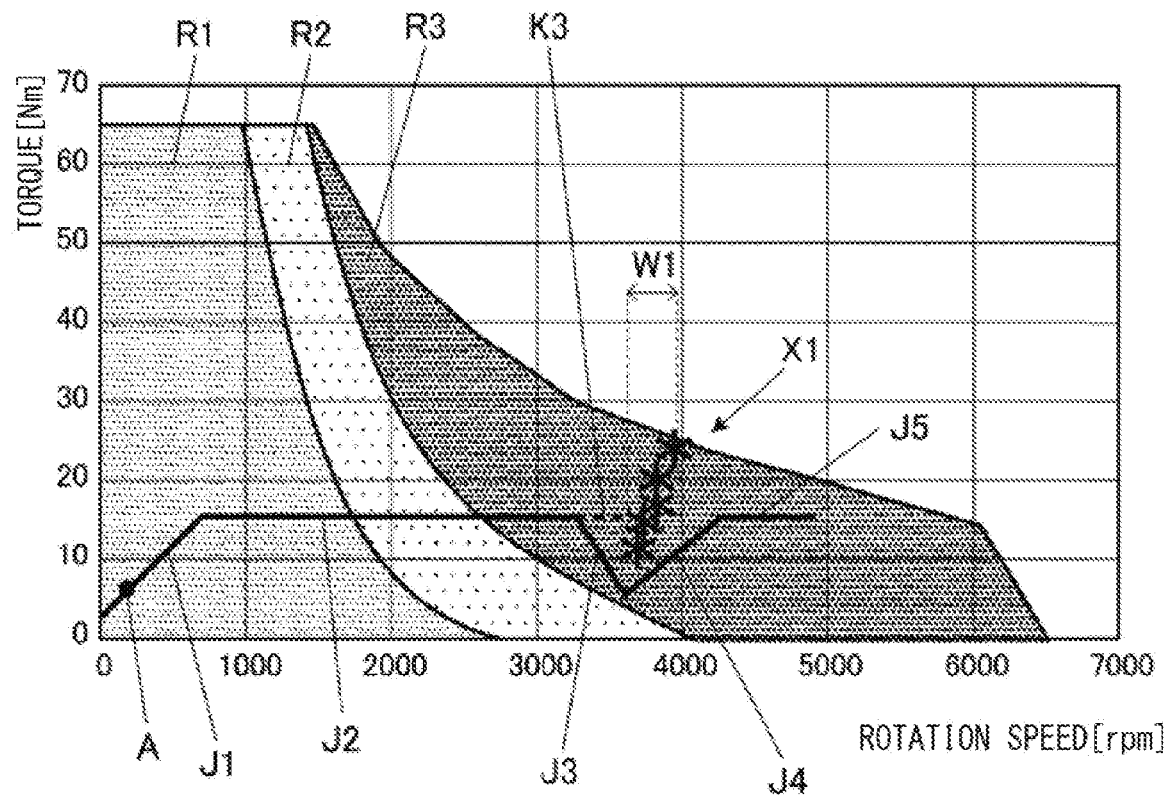
FIG. 7A is a graph that illustrates an example of workings of the vehicle control apparatus according to the second embodiment, illustrating an example of transitions of an operating point of a first driving source.
Figure 7B:
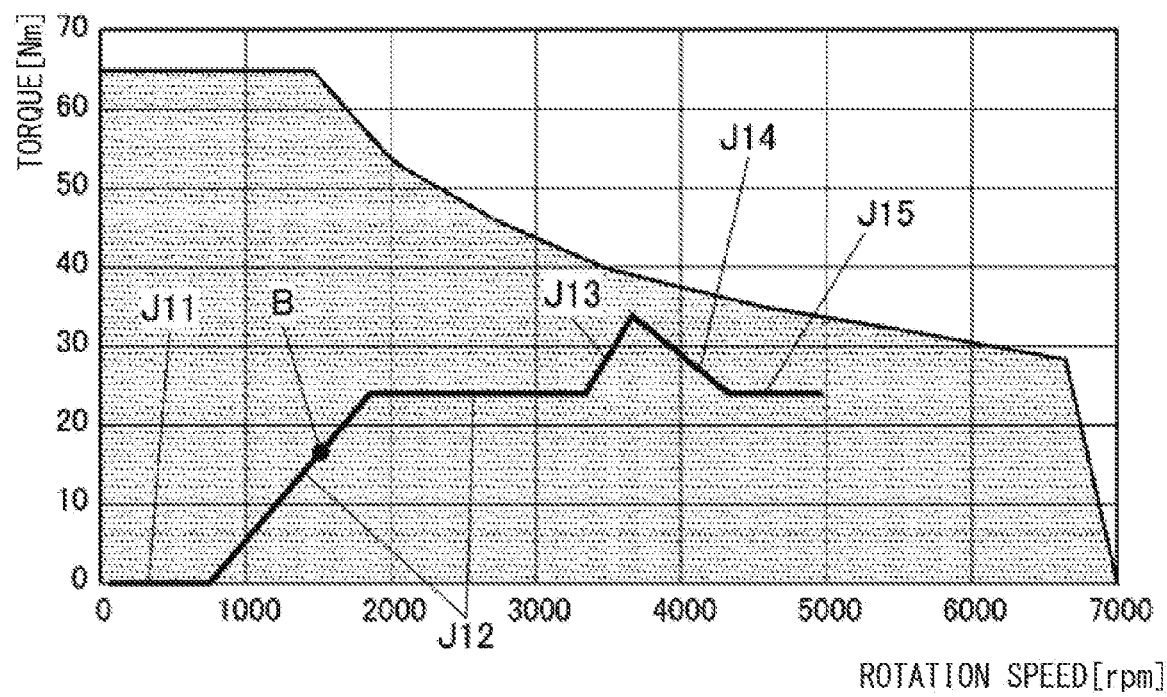
FIG. 7B is a graph that illustrates an example of the workings of the vehicle control apparatus according to the second embodiment, illustrating an example of transitions of an operating point of a second driving source.

FIGS. 7A and 7B illustrate examples of workings of the vehicle control apparatus according to the second embodiment. FIG. 7A illustrates transitions of the operating point A of the first driving source 4 in one travel example of the vehicle 1A. FIG. 7B illustrates transitions of an operating point B of the second driving source 5 in the same travel example as in FIG. 7A. Timing at which the operating point A of the first driving source 4 makes the transitions along the loci J1 to J5 in FIG. 7A matches timing at which the operating point B of the second driving source 5 makes the transitions along loci J11 to J15 in FIG. 7B.

In the travel example in FIGS. 7A and 7B, the vehicle speed is gradually increased by the output of the torque of the first driving source 4 and the second driving source 5. This is accompanied by a gradual increase in the rotation speeds of the first driving source 4 and the second driving source 5. In the travel example, the driver keeps the amount of the accelerator operation constant during a period of time in which the operating point A makes the transitions along the loci J3 and J4.

In FIG. 7A, as with the first embodiment, the locus J3 indicates the locus of the operating point A in the case where the processor 12 decreases the first torque command value to avoid the first resonance points X1. As with the first embodiment, the locus J4 indicates the locus of the operating point A in the case where after avoiding the first resonance points X1, the processor 12 increases the first torque command value to restore the first torque command value to the target torque of the first driving source 4.

In the second embodiment, as described above, in increasing or decreasing the first torque command value to avoid the first resonance points X1, the processor 12 may increase or decrease the first torque command value reversely to the first torque command value (locus J13 in FIG. 7B). The term "reversely" means decreasing with respect to increasing, and increasing with respect to decreasing. Similarly, after avoiding the first resonance points X1, in increasing or decreasing the first torque command value toward the target torque of the first driving source 4, the processor 12 may increase or decrease the second torque command value reversely to the first torque command value (locus J14 in FIG. 7B). Thus, linking the second torque command value with the first torque command value, and increasing or decreasing the second torque command value reversely to the first torque command value make it possible to reduce torque fluctuation of the whole vehicle 1A. In other words, in avoiding the first resonance points X1, it is possible to allow the torque of the whole vehicle 1A to be close to target torque of the whole vehicle 1A.

Control Processing

Figure 8A:
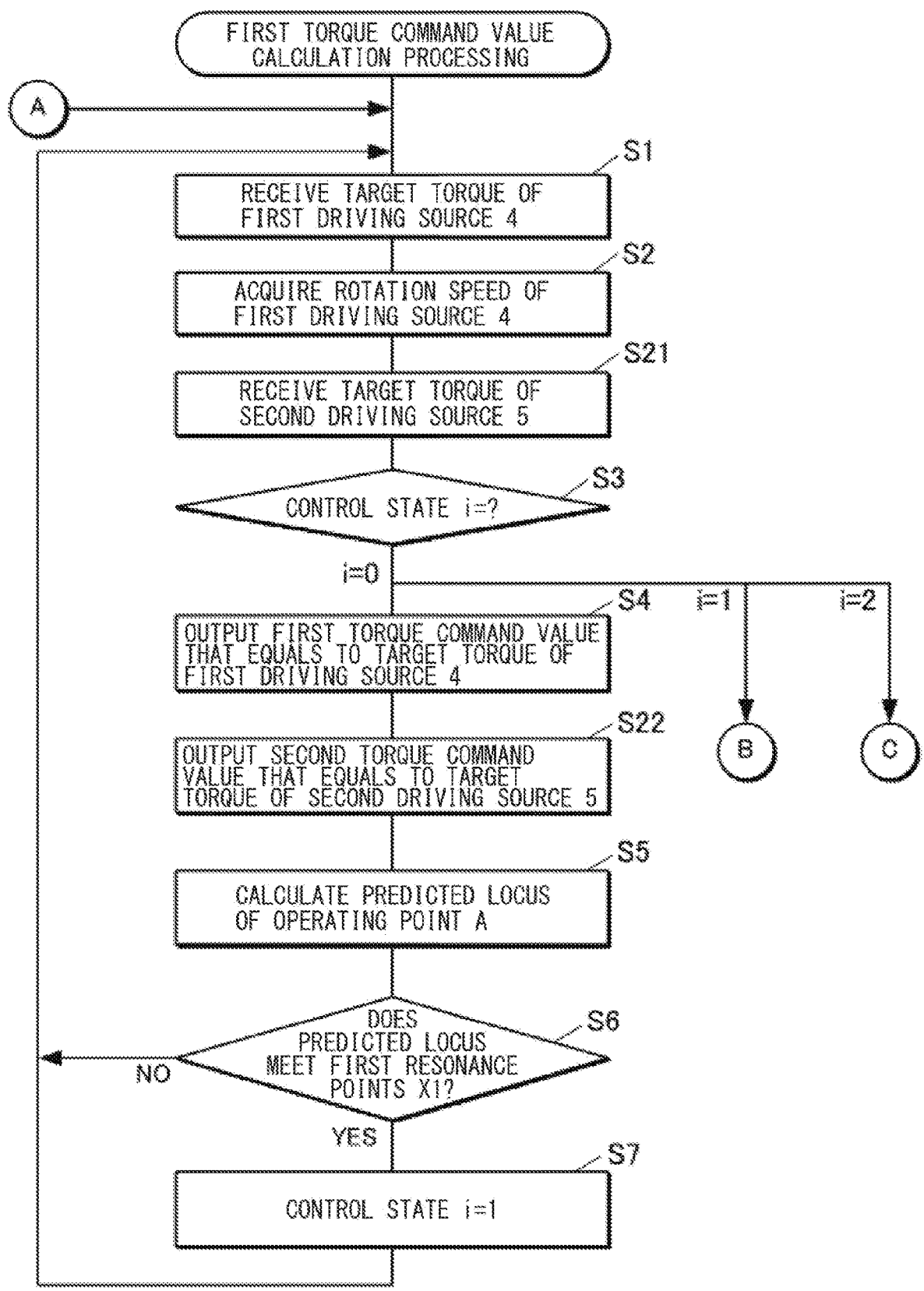
FIG. 8A is a first portion of a flowchart of torque command value calculation processing to be carried out by a processor in the second embodiment.
Figure 8B:
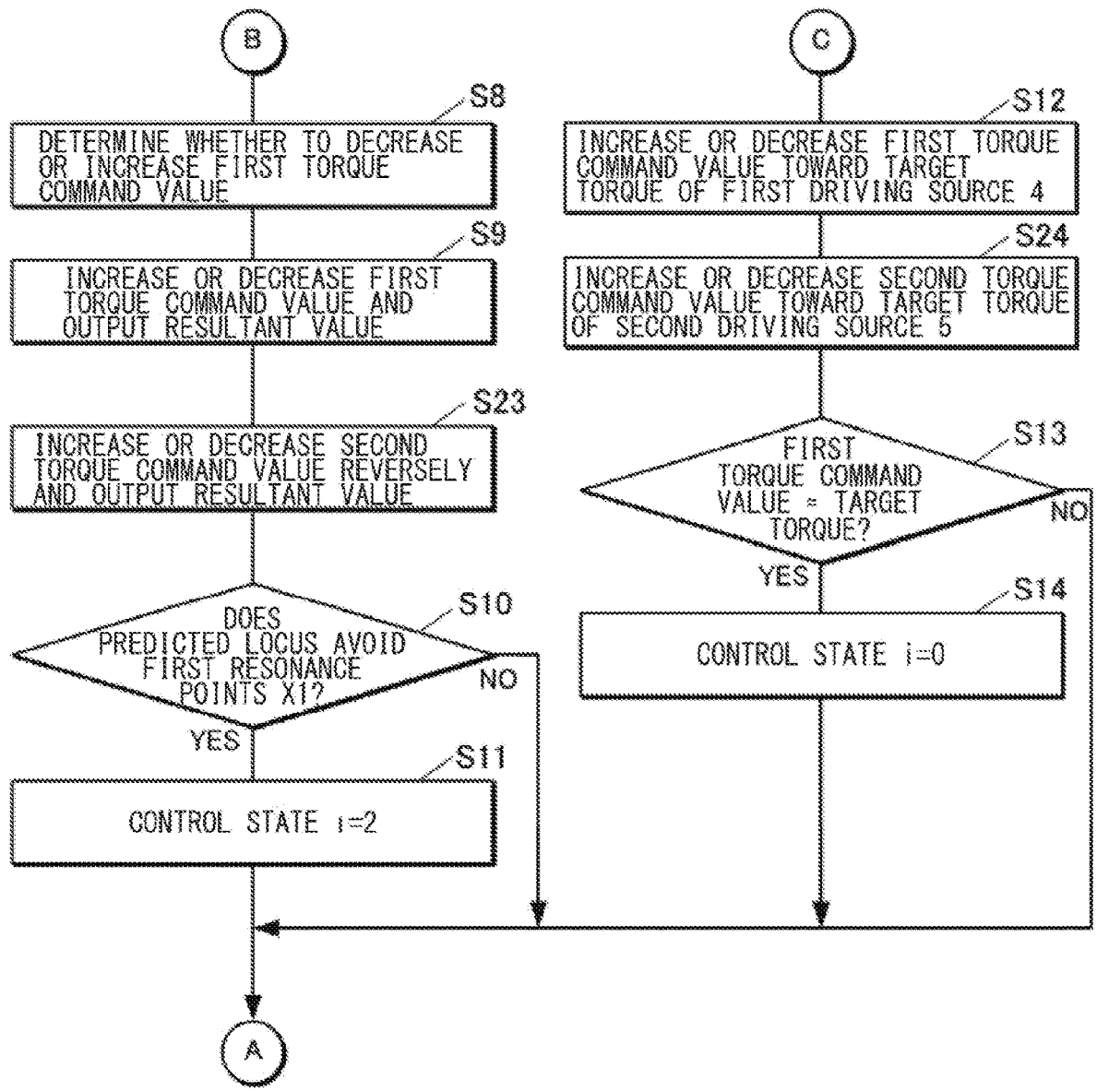
FIG. 8B is a second portion of the flowchart of the torque command value calculation processing to be carried out by the processor in the second embodiment.

Description now moves on to an example of control processing of the processor, to realize the control operation as described above. FIGS. 8A and 8B are flowcharts of torque command value calculation processing to be carried out by the processor. In FIGS. 8A and 8B, steps S1 to S14 are the same as steps S1 to S14 (FIG. 5) of the torque command value calculation processing of the first embodiment. Detailed description of the same steps is omitted.

In the torque command value calculation processing of the second embodiment, after step S2, the processor 12 may receive target torque of the second driving source 5 calculated by separate control processing (step S21).

After step S4, the processor 12 may output the target torque received in step S21, as the second torque command value, to the control circuit of the auxiliaries 8 (step S22).

After step S9, the processor 12 may increase or decrease the second torque command value in reversed relation to the increasing or decreasing of the first torque command value, and output the resultant second torque command value to the control circuit of the auxiliaries 8 (step S23).

After step S12, the processor 12 may increase or decrease the second torque command value toward the target torque of the second driving source 5, and output the resultant second torque command value to the control circuit of the auxiliaries (step S24).

With such control processing, it is possible to provide the control operation in which the second torque command value is increased or decreased reversely to the first torque command value, in linkage with the increasing or decreasing of the first torque command value in avoiding the first resonance points X1.

As described, according to the vehicle control apparatus 10 of the second embodiment, the processor 12 may increase the second torque command value, in decreasing the first torque command value to avoid the first resonance points X1. The processor 12 may decrease the second torque command value, in increasing the first torque command value to avoid the first resonance points X1. Hence, it is possible to reduce the torque fluctuation of the whole vehicle 1A, in suppressing the noise sound accompanying the electrical resonance occurring in the first driving source 4, the inverter 6, and their vicinities in the case with the first driving source 4 under the square wave control. In other words, it is possible to allow the torque of the whole vehicle 1A to be close to the target torque of the whole vehicle 1A.

Third Embodiment

Figure 9:
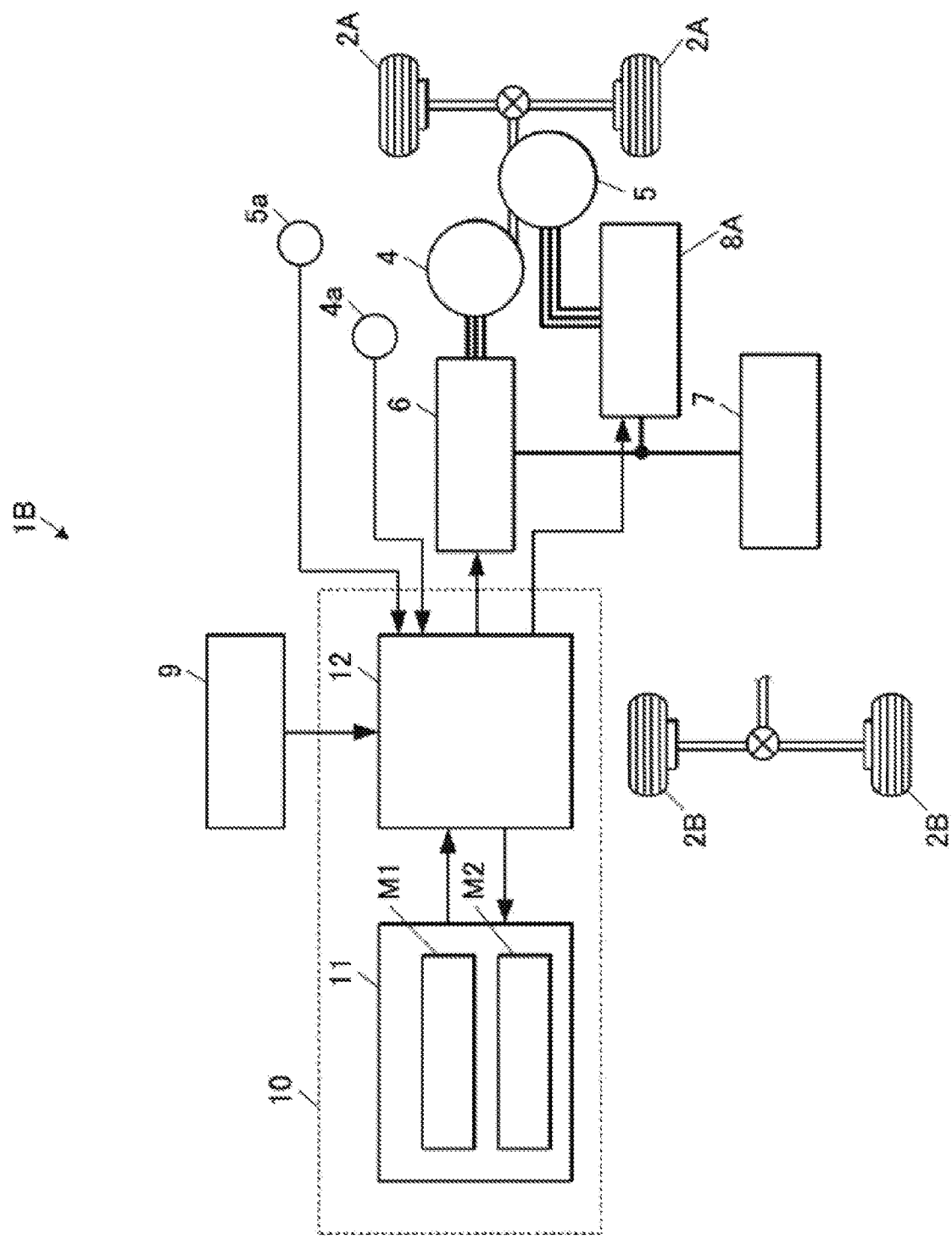
FIG. 9 is a block diagram of a vehicle on which a vehicle control apparatus according to a third embodiment of the disclosure is mounted.
Figure 10:
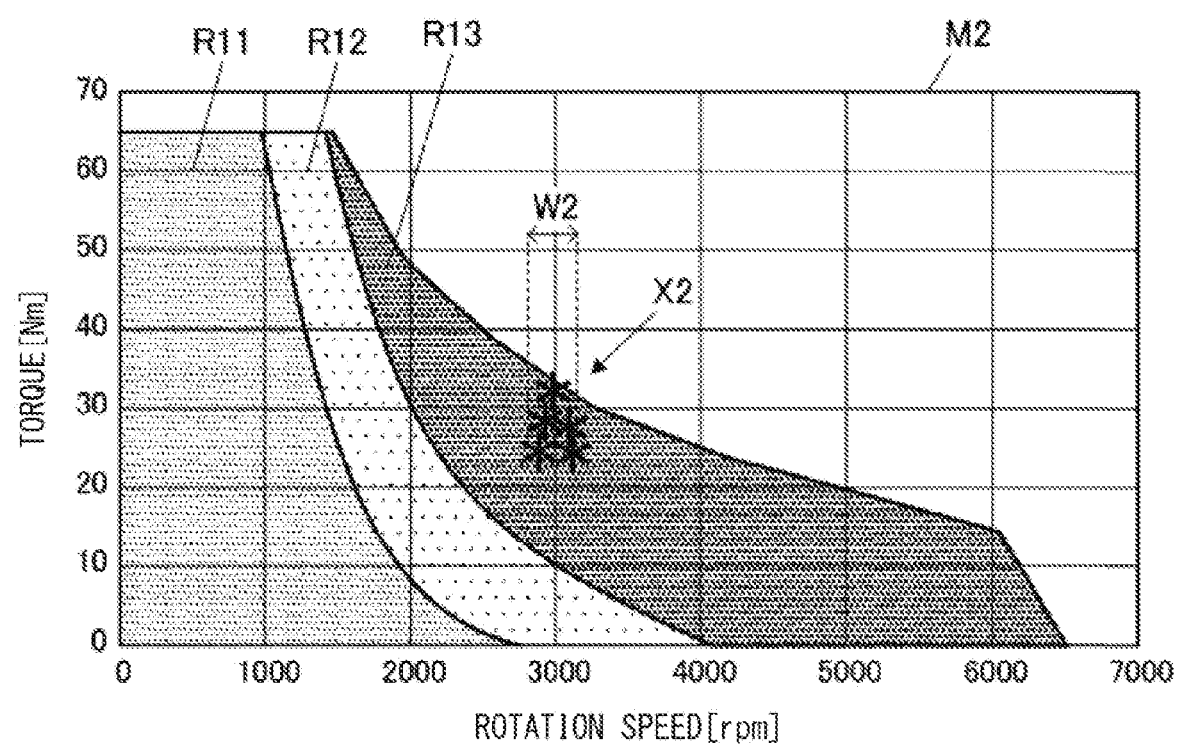
FIG. 10 is a graph that illustrates a second resonance map held in a storage.

FIG. 9 is a block diagram of a vehicle on which a vehicle control apparatus according to a third embodiment is mounted. FIG. 10 illustrates a second resonance map held in a storage.

A vehicle 1B on which a vehicle control apparatus 10 of the third embodiment is mounted differs from the second embodiment mainly in that the second driving source 5 includes an electric motor that is configured to be subjected to the square wave control. The processor 12 may calculate not only the first torque command value but also the second torque command value. The second torque command value indicates the value of the torque to be outputted to the first wheels 2A. The second torque command value may be outputted to a control circuit of an inverter 8A. The inverter 8A is configured to drive the second driving source 5. The control circuit of the inverter 8A may make a feedback control to allow the torque that matches the second torque command value to be outputted from the second driving source 5, to control operation of the inverter 8A. The vehicle 1B may include, without limitation, a speed sensor 5a. The speed sensor 5a is configured to measure directly or indirectly a rotation speed of the second driving source 5. A measured value of the speed sensor 5a may be sent to the processor 12.

The storage 11 of the vehicle control apparatus 10 may hold a second resonance map M2 in addition to the first resonance map M1 described in the first embodiment. As illustrated in FIG. 10, the second resonance map M2 may include, as second resonance points X2, one or more operating points at which resonance occurs in the second driving source 5 or its vicinities in an operating region R13 of the second driving source 5 under the square wave control. The second resonance map M2 may be created in advance on the basis of, for example, tests or simulation, and held in the storage 11.

Operating regions of the second driving source 5 may be represented by two-dimensional regions that have, as components, the rotation speed of the second driving source 5 and the torque of the second driving source 5. Any point in the relevant regions corresponds to one operating point of the second driving source 5. The operating regions of the second driving source 5 may include, without limitation, an operating region R11, an operating region R13, and an operating region R12. In the operating region R11, the sine wave control is carried out. In the operating region R13, the square wave control is carried out. In the operating region R12, the transient control between the sine wave control and the square wave control is carried out.

A plurality of the second resonance points X2 included in the second resonance map M2 is included in the operating region R13 in which the square wave control is carried out. The plurality of the second resonance points X2 typically gather in a specific rotation speed range W2 in the operating region R13. The second resonance points X2 may sometimes gather in the single rotation speed range W2, or alternatively, the second resonance points X2 may sometimes gather in a plurality of the specific rotation speed ranges W2. Moreover, the second resonance points X2 are typically located at a higher torque level in the specific rotation speed range W2. In many cases, the second resonance points X2 are absent from a lower torque level in the specific rotation speed range W2.

In the vehicle 1B, in the case where both the first driving source 4 and the second driving source 5 output torque, the rotation speed of the first driving source 4 and the rotation speed of the second driving source 5 are restricted by a predetermined first ratio. For example, let us assume a case where rotational motion of the first driving source 4 is outputted to the first wheels 2A at a reduction ratio of ¼, and rotational motion of the second driving source 5 is outputted to the first wheel 2A at a reduction ratio of ½. In this case, the rotation speed of the first driving source 4 takes a value obtained by multiplying the rotation speed of the second driving source 5 by the first ratio "2". In the following, description is given of a case where the first ratio is "1", i.e., a case where the rotation speed of the first driving source 4 matches the rotation speed of the second driving source 5. However, the first ratio may take other values than "1".

In the third embodiment, setting may be provided that hinders the operating point of the first driving source 4 and the operating point of the second driving source 5 from meeting respectively the first resonance points X1 and the second resonance points X2 at the same time.

The setting as mentioned above may be provided by allowing a resonance frequency characteristic of the first driving source 4 and its peripheral circuit, and a resonance frequency characteristic of the second driving source 5 and its peripheral circuit to differ, or by allowing a gear ratio of the first driving source 4 and a gear ratio of the second driving source 5 to differ. Alternatively, the setting as mentioned above may be provided by allowing both the resonance frequency characteristics as mentioned above and the gear ratios as mentioned above to differ.

As a result, the rotation speed range W1 (see FIG. 2) of the first resonance map M1 in which the first resonance points X1 are located does not overlap a region obtained by multiplying, by the first ratio "1", the rotation speed range W2 (see FIG. 10) of the second resonance map M2 in which the second resonance points X2 are located.

Operation Example

Figure 11A:
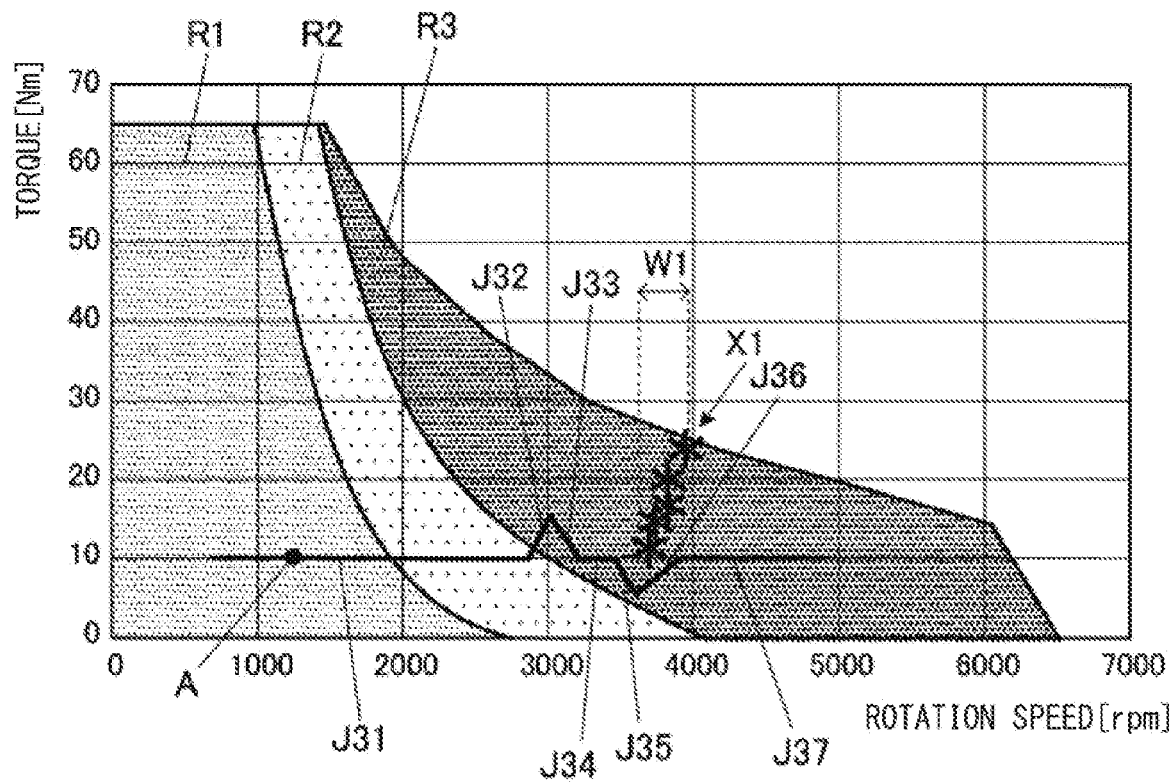
FIG. 11A is a graph that illustrates an example of workings of the vehicle control apparatus according to the third embodiment, illustrating an example of transitions of an operating point of a first driving source.
Figure 11B:
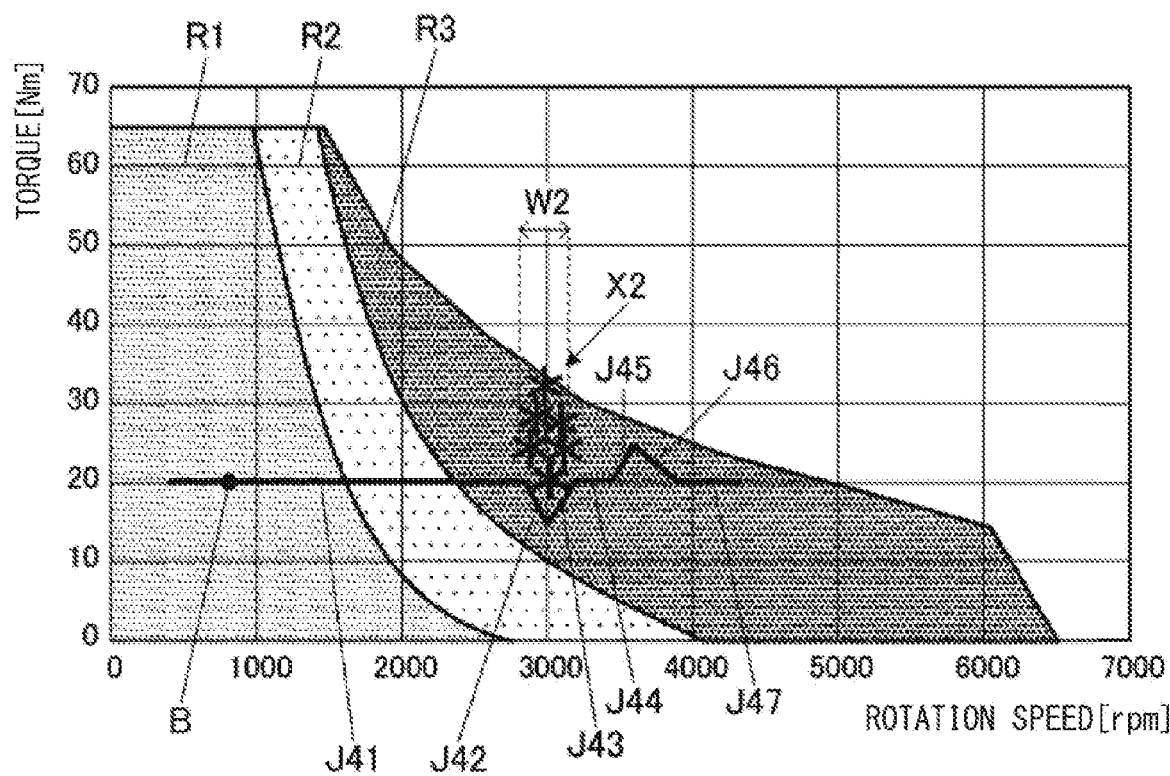
FIG. 11B is a graph that illustrates an example of the workings of the vehicle control apparatus according to the third embodiment, illustrating an example of transitions of an operating point of a second driving source.

FIGS. 11A and 11B illustrate examples of workings of the vehicle control apparatus according to the third embodiment. FIG. 11A illustrates transitions of the operating point A of the first driving source 4 in one travel example of the vehicle 1B. FIG. 11B illustrates transitions of the operating point B of the second driving source 5 in the same travel example as in FIG. 11A. Timing at which the operating point A of the first driving source 4 makes the transitions along the loci J31 to J37 in FIG. 11A matches timing at which the operating point B of the second driving source 5 makes the transitions along the loci J41 to J47 in FIG. 11B.

In the travel example in FIGS. 11A and 11B, the vehicle speed is gradually increased by the output of the torque of the first driving source 4 and the second driving source 5. This is accompanied by a gradual increase in the rotation speeds of the first driving source 4 and the second driving source 5. In the travel example, the driver keeps the amount of the accelerator operation constant during a period of time in which the operating point A makes the transitions along the loci J32, J33, J35, and J36, and during a period of time in which the operating point B makes the transitions along the loci J42, J43, J45, and J46.

In FIG. 11B, the locus J42 indicates the locus of the operating point B in a case where the processor 12 decreases the second torque command value to avoid the second resonance points X2. The locus J43 indicates the locus of the operating point B in a case where after avoiding the second resonance points X2, the processor 12 increases the second torque command value to restore the second torque command value to the target torque of the second driving source 5.

Furthermore, in FIG. 11A, the loci J32 and J33 indicate the loci of the operating point A in a case where, in increasing or decreasing the second torque command value to avoid the second resonance points X2, the processor 12 increases or decreases the first torque command value reversely to the second torque command value. Thus, linking the first torque command value with the second torque command value, and increasing or decreasing the first torque command value reversely to the second torque command value make it possible to reduce torque fluctuation of the whole vehicle 1B, in avoiding the second resonance points X2. In other words, it is possible to allow the torque of the whole vehicle 1B to be close to the target torque of the whole vehicle 1B, in avoiding the second resonance points X2.

In FIG. 11A, the locus J35 indicates the locus of the operating point A in a case where the processor 12 decreases the first torque command value to avoid the first resonance points X1. The locus J36 indicates the locus of the operating point A in a case where after avoiding the first resonance points X1, the processor 12 increases the first torque command value to restore the first torque command value to the target torque of the first driving source 4.

Furthermore, in FIG. 11B, the loci J45 and J46 indicate the loci of the operating point B in a case where the processor increases or decreases the second torque command value reversely to the first torque command value, in increasing or decreasing the first torque command value to avoid the first resonance points X1. Thus, linking the second torque command value with the first torque command value, and increasing or decreasing the second torque command value reversely to the first torque command value make it possible to reduce the torque fluctuation of the whole vehicle 1B, in avoiding the first resonance points X1. In other words, it is possible to allow the torque of the whole vehicle 1B to be close to the target torque of the whole vehicle 1B, in avoiding the first resonance points X1.

As mentioned above, the rotation speed range W1 of the first driving source 4 in which the first resonance points X1 are located does not overlap with the rotation speed range W2 of the second driving source 5 in which the second resonance points X2 are located, i.e., the range obtained by multiplying, by the first ratio "1", the rotation speed range W2 of the second driving source 5 in which the second resonance points X2 are located. Accordingly, in increasing or decreasing the first torque command value to avoid the first resonance points X1, there is little possibility that increasing or decreasing the second torque command value in linkage with the increasing or decreasing of the first torque command value causes the operating point B of the second driving source 5 to meet the second resonance points X2. Similarly, in increasing or decreasing the second torque command value to avoid the second resonance points X2, there is little possibility that increasing or decreasing the first torque command value in linkage with the increasing or decreasing of the second torque command value causes the operating point A of the first driving source 4 to meet the first resonance points X1.

Control Processing

Figure 12A:
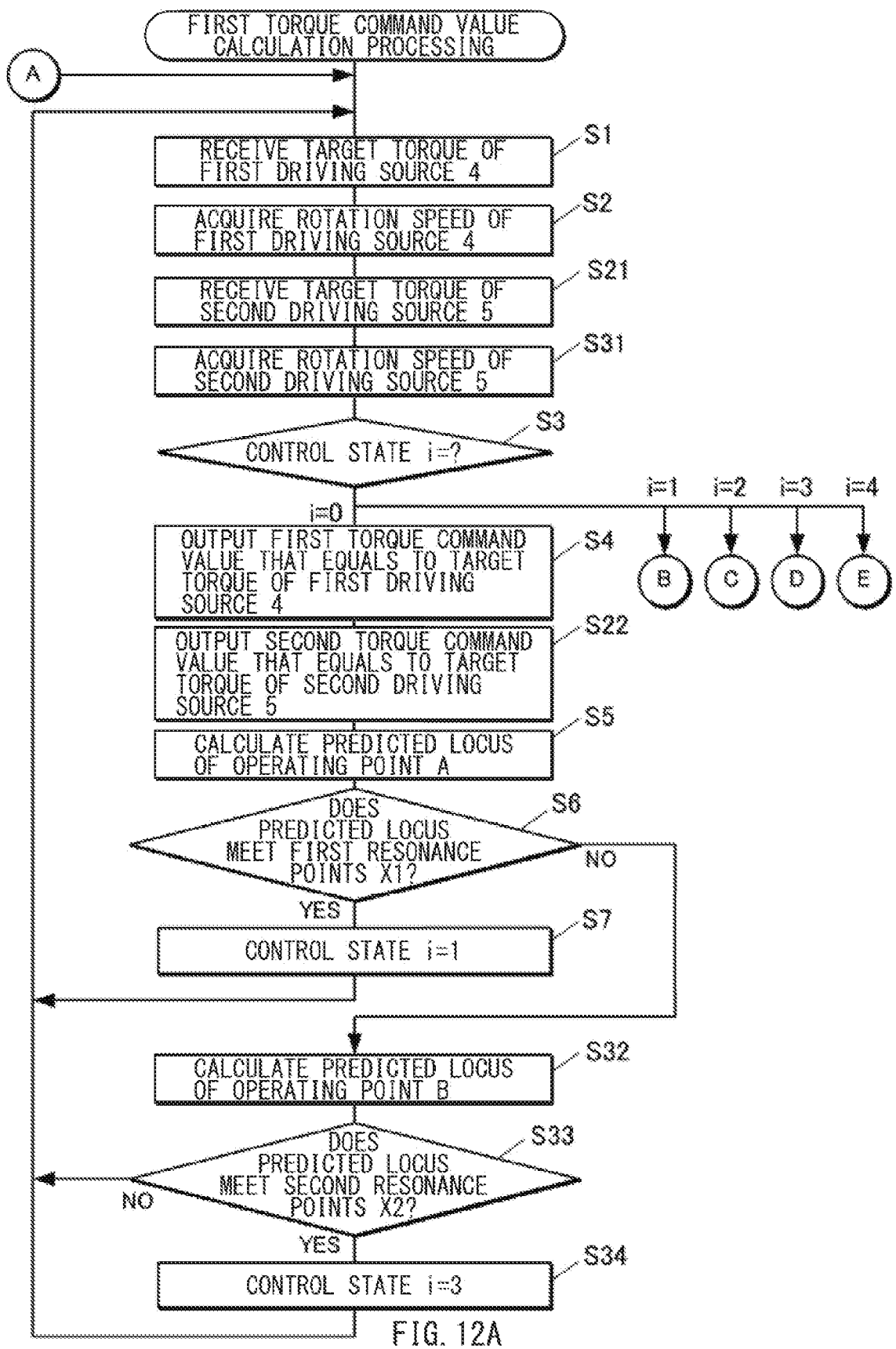
FIG. 12A is a first portion of a flowchart of torque command value calculation processing to be carried out by a processor in the third embodiment.
Figure 12B:
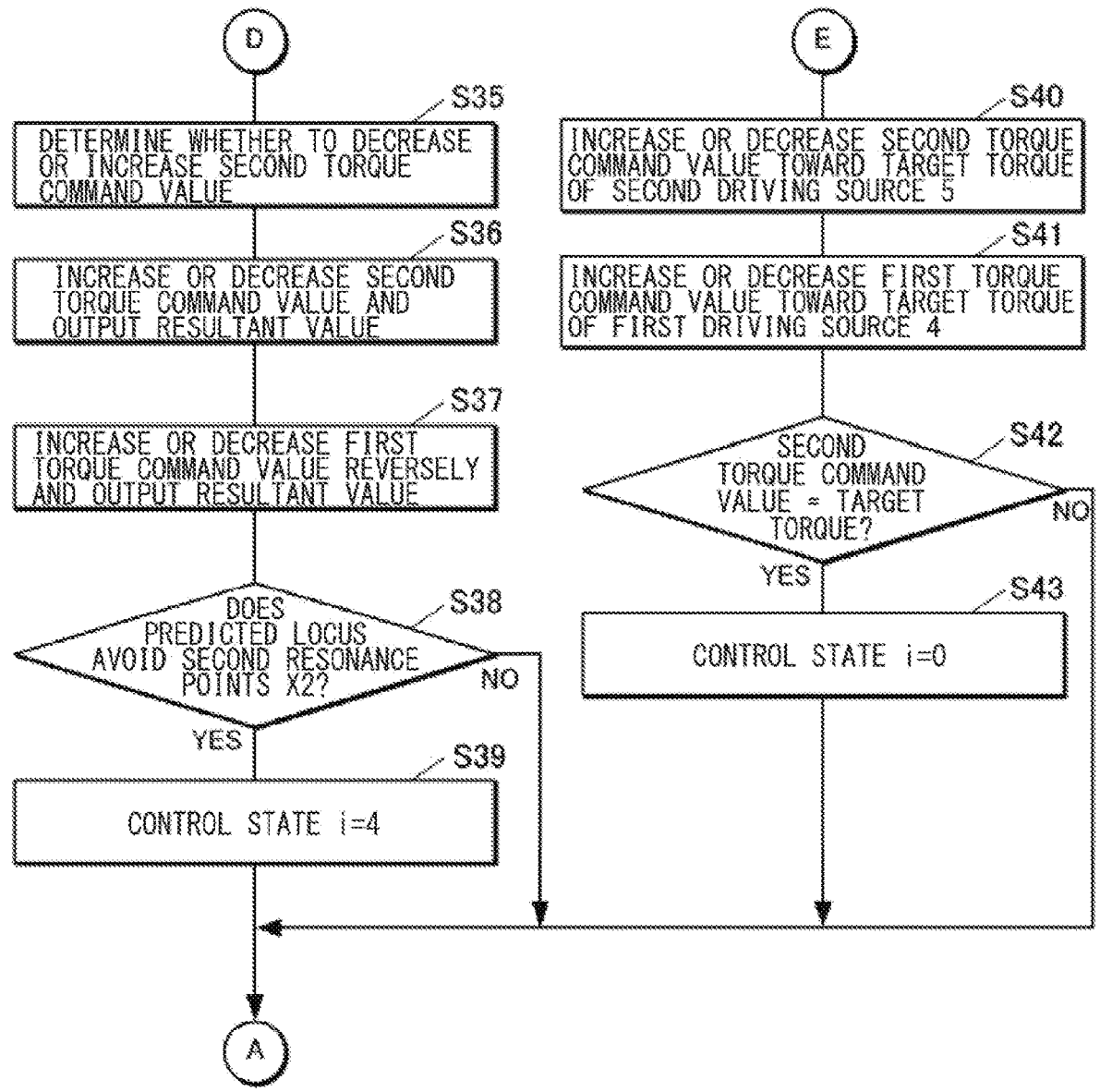
FIG. 12B is a third portion of the flowchart of the torque command value calculation processing to be carried out by the processor in the third embodiment.

Description is given next of an example of control processing of the processor, to realize the control operation described above. FIGS. 12A and 12B illustrate respectively first and third portions of a flowchart of torque command value calculation processing to be carried out by the processor. In FIG. 12A, steps S1, S2, S4 to S7, S21, and S22 are the same as steps S1, S2, S4 to S7, S21, and S22 (FIG. 8A) of the torque command value calculation processing of the second embodiment. In FIG. 12A, the branching process in step S3 in the case with the control state i=1 and i=2 is the same as that in FIG. 8B. Detailed description of the same steps is omitted.

In the torque command value calculation processing of the third embodiment, after step S21, the processor 12 may acquire the measured value of the rotation speed of the second driving source 5 from the speed sensor 5a (step S31).

The branching process in step S3 may further include branching with the control state i=3 and i=4 in addition to branching with the control state i=1 and i=2.

In the torque command value calculation processing of the third embodiment, in step S6 of FIG. 12A, in the case with the determination in negation (NO), the processor 12 may calculate the predicted locus of the operating point B of the second driving source 5 (step S32). A calculation method of the predicted locus is the same as the calculation method of the predicted locus of the operating point A of the first driving source 4. Each operating point on the predicted locus corresponds to the predicted route of the transition of the operating point B. Thereafter, the processor 12 may compare the predicted locus with the second resonance map M2, and determine whether or not the predicted locus meets the second resonance points X2 (step S33). In a case with a determination in negation (NO), the processor 12 may cause the flow to return to step S1. In a case with a determination in affirmation (YES), the processor 12 may switch the control state i to a value "3" to increase or decrease the second torque command value (step S34), and cause the flow to return to step S1.

As a result of the branching process in step S3, in the case with the control state i=1 and i=2, the similar control processing to the second embodiment may be carried out. That is, in the case with the control state i=1, the processing of steps S8 to S10 and S23 in FIG. 8B may be repeatedly carried out, causing the first torque command value to be decreased or increased to avoid the first resonance points X1. In addition, the second torque command value may be increased or decreased, in the reversed relation to the increasing or decreasing of the first torque command value.

Thus, the operating point A is allowed to avoid the first resonance points X1, and thereupon, in step S11, the control state i is updated to "2".

In the case with the control state i=2, the processing of steps S12 and S13, and S24 in FIG. 8B may be repeatedly carried out, causing the first torque command value to be increased or decreased toward the target torque of the first driving source 4. In addition, the second torque command value may be increased or decreased toward the target torque of the second driving source 5. Thus, the first torque command value substantially matches the target torque of the first driving source 4, and thereupon, in step S14, the control state i is restored to "0".

In the branching process in step S3, in the case with the control state i=3, the processor 12 may cause the flow to proceed to step S35 in FIG. 12B. A processing sequence of steps S35 to S39 is similar to that of steps S8, S9, S23, S10, and S11 in FIG. 8B. That is, steps S35 to S39 are equivalent to steps S8, S9, S23, S10, and S11 in FIG. 8B in which: the first torque command value is replaced with the second torque command value; the first resonance points X1 are replaced with the second resonance points X2; and the control state i=2 is replaced with the control state i=4. Carrying out repeatedly the processing of steps S35 to S38 in FIG. 12B causes the second torque command value to be decreased or increased, to avoid the second resonance points X2. In addition, the first torque command value is increased or decreased in reversed relation to the increasing or decreasing of the second torque command value. Thus, the operating point B is allowed to avoid the second resonance points X2, and thereupon, in step S39, the control state i is updated to "4".

In the branching process in step S3, in the case with the control state i=4, the processor 12 may cause the flow to proceed to step S40 in FIG. 12B. A processing sequence of steps S40 to S43 is similar to that of steps S12, S24, S13, and S14 in FIG. 8B. That is, steps S40 to S43 are equivalent to steps S12, S24, S13, and S14 in FIG. 8B in which: the first torque command value is replaced with the second torque command value, and the target torque of the first driving source 4 is replaced with the target torque of the second driving source 5. Carrying out repeatedly the processing of steps S40 to S42 in FIG. 12B causes the second torque command value to be increased or decreased toward the target torque of the second driving source 5. In addition, the first torque command value is increased or decreased toward the target torque of the first driving source 4. Thus, the second torque command value substantially matches the target torque of the second driving source 5, and thereupon, in step S43, the control state i is restored to "0".

In the torque command value calculation processing, the processor 12 may determine whether or not the operating point A of the first driving source 4 is located in the operating region R3. Alternatively, the processor 12 may determine whether or not the operating point A of the first driving source 4 is located in the operating regions R2 and R3. Solely in a case where the determination results in affirmation (YES), the processor 12 may perform the process (step S5) of calculating the predicted locus of the operating point A, and the process (step S6) of comparing the predicted locus with the first resonance map M1. In another alternative, the processor 12 may determine whether or not the operating point B of the second driving source 5 is located in the operating region R13. Alternatively, the processor 12 may determine whether or not the operating point B of the second driving source 5 is located in the operating regions R12 and R13. Solely in a case where the determination results in affirmation (YES), the processor 12 may perform the process (step S32) of calculating the predicted locus of the operating point B, and the process (step S33) of comparing the predicted locus with the second resonance map M2. With such control processing, it is possible to save the processor 12 a load of the control processing in the case with the first driving source 4 under the sine wave control and in the case with the second driving source 5 under the sine wave control.

With such torque command value calculation processing, the operation illustrated in FIGS. 11A and 11B is provided.

As described, according to the vehicle control apparatus 10 of the third embodiment, in decreasing the first torque command value to avoid the first resonance points X1, the processor 12 may increase the second torque command value. Furthermore, in increasing the first torque command value to avoid the first resonance points X1, the processor 12 may decrease the second torque command value. Hence, it is possible to reduce the torque fluctuation of the whole vehicle 1B in suppressing the noise sound accompanying the electrical resonance occurring in the first driving source 4, the inverter 6, and their vicinities, with the first driving source 4 under the square wave control. In other words, it is possible to allow the torque of the whole vehicle 1B to be close to the target torque of the whole vehicle 1B. Moreover, it is possible to reduce possibility of the generation of the noise sound accompanying the electrical resonance occurring in the second driving source 5, the inverter 8A, and their vicinities.

Similarly, in decreasing the second torque command value to avoid the second resonance points X2, the processor 12 may increase the first torque command value. Furthermore, in increasing the second torque command value to avoid the second resonance points X2, the processor 12 may decrease the first torque command value. Hence, it is possible to reduce the torque fluctuation of the whole vehicle 1B, in suppressing the noise sound accompanying the electrical resonance occurring in the second driving source 5, the inverter 8A, and their vicinities, with the second driving source 5 under the square wave control. In other words, it is possible to allow the torque fluctuation of the whole vehicle 1B to be close to the target torque of the whole vehicle 1B. Moreover, it is possible to reduce the possibility of the generation of the noise sound accompanying the electrical resonance occurring in the first driving source 4, the inverter 6, and their vicinities.

Fourth Embodiment

Figure 13:
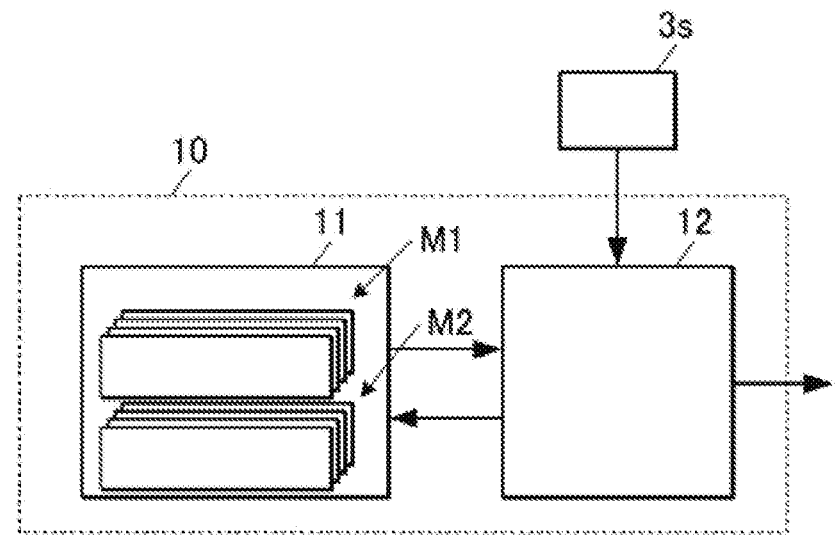
FIG. 13 is a block diagram of a vehicle control apparatus according to a fourth embodiment of the disclosure.

FIG. 13 is a block diagram of a vehicle control apparatus according to a fourth embodiment. The vehicle control apparatus 10 according to the fourth embodiment may be mounted on the vehicle 1B of the third embodiment described above. In the fourth embodiment, the storage 11 of the vehicle control apparatus 10 may hold a plurality of the first resonance maps M1 and a plurality of the second resonance maps M2. The plurality of the first resonance maps M1 and the plurality of the second resonance maps M2 correspond to respective ones of a plurality of environmental conditions. The environmental conditions may include, without limitation, an outside air temperature, a temperature of the first driving source 4 and the inverter 6, a temperature of the second driving source 5 and the inverter 8A, and an output voltage of the battery 7. The environmental conditions may include any other environmental conditions that influence the positions of the first resonance points X1 in the operating regions of the first driving source 4 and the positions of the second resonance points X2 in the operating regions of the second driving source 5. The plurality of the first resonance maps M1 and the plurality of the second resonance maps M2 may be held in association with the respective ones of the plurality of the environmental conditions.

The vehicle 1B on which the vehicle control apparatus 10 is mounted may include, without limitation, an environment sensor 3s. The environment sensor 3s is configured to measure the environmental conditions. A measured value of the environment sensor 3s may be outputted to the processor 12.

Figure 14:
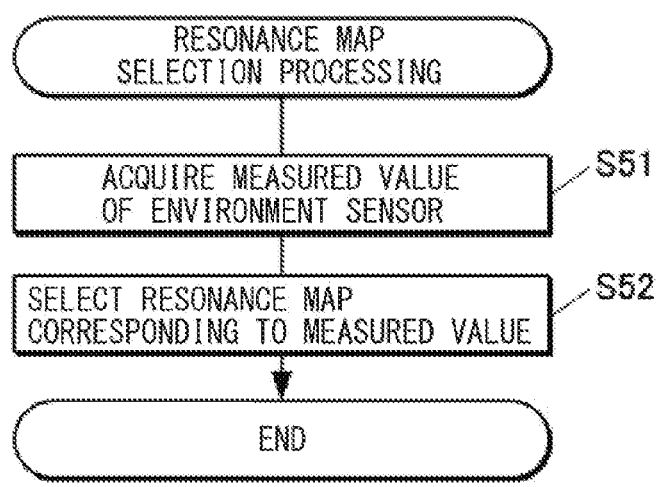
FIG. 14 is a flowchart of resonance map selection processing to be carried out by a processor in the fourth embodiment.

FIG. 14 is a flowchart of resonance map selection processing to be carried out by the processor according to the fourth embodiment. The processor 12 may carry out the resonance map selection processing at a start-up of a system of the vehicle 1B, or at timing at which a change in the environment is expected. The processor 12 may acquire the measured value from the environment sensor 3s (step S51), and select one of the first resonance maps M1 and one of the second resonance maps M2 that correspond to the measured value (step S52).

The processor 12 may carry out the torque command value calculation processing of the third embodiment, with the use of the selected one of the first resonance maps M1 and the selected one of the second resonance maps M2.

In the vehicle control apparatus 10 to be mounted on the vehicles 1 and 1A described in the first and second embodiments, it suffices that the storage 11 holds the plurality of the first resonance map M1 that corresponds to respective ones of the environmental conditions. The vehicles 1 and 1A described in the first and second embodiments mean a vehicle devoid of the second driving source 5, or a vehicle devoid of the resonance points in the operating regions of the second driving source 5. In this case, it suffices that the processor 12 selects one of the first resonance maps M1 that corresponds to one of the environmental conditions, to calculate the first torque command value with the use of the selected one of the first resonance maps M1.

As described, according to the vehicle control apparatus 10 of the fourth embodiment, in a case with a change in the resonance points depending on the environmental conditions, it is possible to suppress, in response to the change, the generation of the noise sound accompanying the electrical resonance occurring in the first driving source 4, the inverter 6, and their vicinities. Similarly, it is possible to suppress the generation of the noise sound accompanying the electrical resonance occurring in the second driving source 5, the inverter 8A, and their vicinities.

The program of the torque command value calculation processing or the program of the resonance map selection processing described above may be held in a non-transitory computer readable medium such as the ROM of the processor 12. The processor 12 may be configured to read the program held in a portable non-transitory computer readable medium and execute the program. The portable non-transitory computer readable medium as mentioned above may hold the program of the torque command value calculation processing or the program of the resonance map selection processing.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims.

The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing example embodiments, the first resonance points in the operating region under the square wave control are located densely at the higher torque level. Accordingly, in the forgoing example embodiments, the example is described in which the processor decreases the first torque command value to avoid the first resonance points. However, the first resonance points are sometimes located but not at the higher torque level. In such a case, the processor may increase the first torque command value to avoid the first resonance points. The same applies to the second resonance points and the second torque command value.

Moreover, in the forgoing example embodiments, the example is described in which the processor gradually increases or decreases the first torque command value in avoiding the first resonance points. However, the processor may rapidly increase or decrease the first torque command value. The same applies to the second torque command value.

Other details described in the forgoing example embodiments may be changed as appropriate within the scope of the technology.

According to the aspects of the technology, a first resonance map includes one or more first resonance points. A processor is configured to decrease or increase a first torque command value to avoid the one or more first resonance points. Hence, it is possible to reduce resonance occurring on the occasion that an electric motor is under a square wave control.

The processor 12 illustrated in FIGS. 1, 6, 9, and 13 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 12 illustrated in FIGS. 1, 6, 9, and 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 12 illustrated in FIGS. 1, 6, 9, and 13.

The invention claimed is:

1. A vehicle control apparatus to be mounted on a vehicle, the vehicle including a first driving source and a first wheel to which torque is to be outputted from the first driving source, the first driving source including an electric motor, the vehicle control apparatus comprising:
a storage configured to hold a first resonance map; and
a processor configured to calculate a first torque command value that indicates a value of the torque to be outputted by the first driving source, wherein the first resonance map includes, as one or more first resonance points, one or more operating points at which resonance occurs in an operating region of the first driving source under a square wave control, the processor is configured to decrease or increase the first torque command value to avoid the one or more first resonance points on a condition that a predicted route of transition of an operating point of the first driving source meets the one or more first resonance points, the vehicle further includes a second driving source, the second driving source being configured to output torque to the first wheel or a second wheel different from the first wheel, the processor is configured to calculate a second torque command value that indicates a value of the torque to be outputted by the second driving source, the processor is configured to:

increase the second torque command value in decreasing the first torque command value to avoid the one or more first resonance points; and decrease the second torque command value in increasing the first torque command value to avoid the one or more first resonance points, the second driving source includes an electric motor, the storage is configured to hold a second resonance map that includes, as one or more second resonance points, one or more operating points at which resonance occurs in an operating region of the second driving source under a square wave control, components of the first resonance map include a rotation speed of the first driving source and the torque of the first driving source, components of the second resonance map include a rotation speed of the second driving source and the torque of the second driving source, the rotation speed of the first driving source takes a value obtained by multiplying the rotation speed of the second driving source by a first ratio, and a range of the rotation speed of the first driving source in the first resonance map in which the one or more first resonance points are located avoids overlap with a range obtained by multiplying, by the first ratio, a range of the rotation speed of the second driving source in the second resonance map in which the one or more second resonance points are located.

2. The vehicle control apparatus according to claim 1, wherein the processor is configured to:

decrease or increase the second torque command value to avoid the one or more second resonance points on a condition that a predicted route of transition of an operating point of the second driving source meets the one or more second resonance points; and increase the first torque command value in decreasing the second torque command value to avoid the one or more second resonance points, and decrease the first torque command value in increasing the second torque command value to avoid the one or more second resonance points.

3. The vehicle control apparatus according to claim 1, wherein the storage is configured to hold a plurality of the first resonance maps and a plurality of the second resonance maps that correspond to respective ones of a plurality of environmental conditions, and the processor is configured to use one of the plurality of the first resonance maps and one of the plurality of the second resonance maps that correspond to one of the plurality of the environmental conditions.

4. The vehicle control apparatus according to claim 2, wherein the storage is configured to hold a plurality of the first resonance maps and a plurality of the second resonance maps that correspond to respective ones of a plurality of environmental conditions, and the processor is configured to use one of the plurality of the first resonance maps and one of the plurality of the second resonance maps that correspond to one of the plurality of the environmental conditions.

* * * * *